April 30, 1968   J. A. DRUMMOND ET AL   3,380,650
COMPRESSOR CONTROL
Filed Jan. 12, 1967
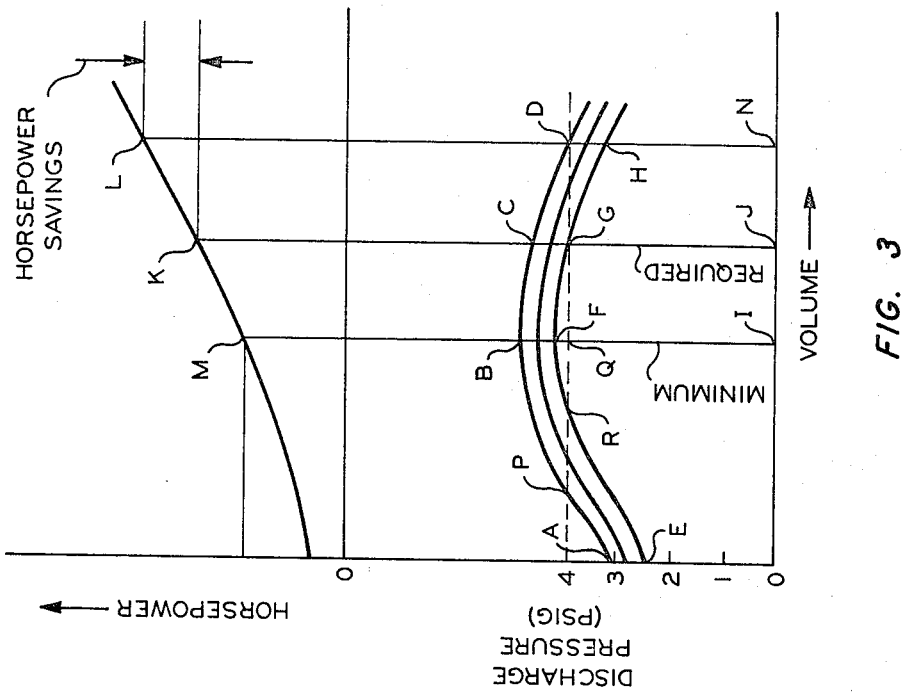
FIG. 3
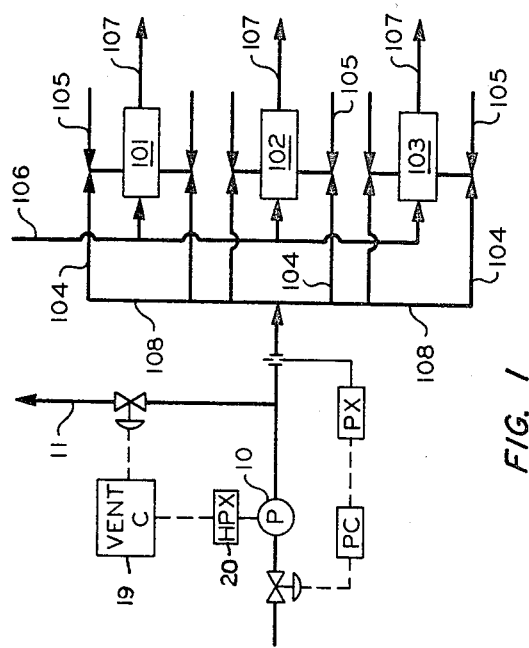
FIG. 1
FIG. 2
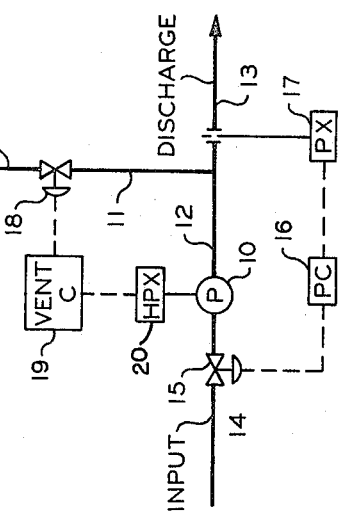
INVENTORS
J. A. DRUMMOND
G. A. GOHLKE
BY
*Young & Quigg*
ATTORNEYS United States Patent Office 3,380,650
Patented Apr. 30, 1968

3,380,650
COMPRESSOR CONTROL
John A. Drummond and Gerhard A. Gohlke, Borger, Tex., assignors to Phillips Petroleum Company, a corporation of Delaware
Filed Jan. 12, 1967, Ser. No. 608,902
1 Claim. (Cl. 230—114)

ABSTRACT OF THE DISCLOSURE

A compressor is controlled so as to;

(1) prevent surging by
 (a) sensing the compressor power consumption, and
 (b) venting sufficient air from the discharge line to stay above the surge point volume in response to the sensed pressure; and
(2) produce only the precise volume of air required at a given pressure by
 (a) sensing the pressure in the discharge line, and
 (b) restricting the movement of air into the compressor suction in response to the sensed pressure.

---

This invention relates to a method of controlling a compressor.

Compressors are used in a wide variety of industrial applications. Typically, compressible fluids are required to be processed and therefore moved at different pressures and, as a result, compressors are used at various stages in a process. Since a gas compressor is frequently designed to produce a particular discharge pressure, the volume demand can vary over wide ranges depending on the process requirements. If the particular compressor is capable of producing an excess volume at the demanded pressure, it is often necessary to vent some of the volume to the atmosphere. This loss of volume necessarily corresponds to a needless expenditure of driven horsepower and hence detracts from the profitability of the process. The problem of producing too great a volume merely to achieve a particular pressure is a consequence of the operating curve for a particular compressor as will be subsequently explained in detail.

The problem of maintaining a compressor discharge pressure into a variable volume process is particularly difficult to solve when the problem of maintaining a constant pressure under variable volume conditions is coupled with the problem of a minimum operating horsepower below which the particular compressor will not function smoothly. The failure of a particular compressor to operate properly below a given minimum value of horsepower or gas volume produced is generically known as "surging," and the minimum point is described as the "surge point." Specifically, the compressor will fail to exhibit smooth operating characteristics below the surge point and will produce an erratic and uncontrolled output. Stated another way, below the surge point the compressor output is in a nonsteady state condition with pressure and volume fluctuating widely and without control, thus the compressor must be operated at a point above the surge point for controllable operation. Since the gas volume produced at a particular pressure can be correlated to horsepower by plotting the volume produced vs. the integral of pressure times volume for a given length of time (horsepower), a control based on sensing horsepower and controlling discharge volume is possible.

The above problem of surging and variable volume delivery at a certain pressure is encountered frequently in process units where one compressor is feeding a fluid into a manifold which in turn feeds several separate and similar pieces of process equipment in parallel operation, simultaneously. Since the pressure in the manifold is predetermined by a design calculation, the compressor must operate differently to produce enough fluid for one than it would to produce enough fluid for two or three, or say, ten units. In one embodiment, this invention provides a method to control a compressor feeding a manifold from which a plurality of processing units are drawing an input stream, and solves the problem of surging as well as the problem of horsepower wastage and hence financial loss resulting from producing an excess of gas volume. The precise reason that too much compressed gas must be produced to meet a given pressure demand will be subsequently described in detail.

In one embodiment, this invention provides a method to control a compressor feeding air to a manifold which in turn provides constant pressure air for a number of carbon black furnaces. In this embodiment, the pressure in the manifold must be maintained at the furnace design pressure while the volume will depend on whether there are 1, 2, 3, etc. furnaces drawing air from the manifold. In this embodiment, a combustion gas is mixed with the air and introduced into a carbon black furnace. A feed oil is then introduced into the furnace and the oil converted to carbon black by partial combustion and an effluent containing the carbon black is removed from the furnace. Thus, in summary, this invention causes the compressor to operate above its surge point regardless of the number of furnaces drawing air (volumetric load), and also prevents horsepower wastage by producing the precise required volume at the design pressure. Stated another way, it is not necessary to vent a portion of the volume produced by the compressor in an effort to supply the correct pressure.

Accordingly, it is an object of this invention to provide a method of controlling a compressor so that operation is above the surge point.

Another object of this invention is to provide a method of controlling a compressor so that the compressor produces only the precise gas volume required at the desired pressure.

Other objects, advantages, and features of this invention will be readily apparent to those skilled in the art from the following description, drawing, and appended claim.

FIGURE 1 is one embodiment of a schematic drawing of the control system being utilized on a compressor feeding a manifold from which three carbon black furnaces are drawing air.

FIGURE 2 is one embodiment of a diagram of only the compressor and control system.

FIGURE 3 is one embodiment of a characteristic pressure vs. volume and horsepower vs. volume plot for a compressor.

With reference to FIGURE 1, there is indicated compressor 10 feeding the attached manifold 108 from which carbon black furnaces 101, 102, and 103 are drawing air through air intake lines 104. According to the operation of the process, a combustion gas in lines 105 is blended with the air in lines 104 and the mixture introduced into carbon black furnaces 101, 102, and 103, along with a make oil from lines 106. The make oil is injected into the furnaces and partially combusted by the action of the burning combustion gas and the effluent, rich in carbon black, is removed by lines 107 for further processing.

According to the operation of the carbon black process, the furnace and hence the manifold 108 are to be maintained at a constant design pressure. Deviation from the design pressure will cause the furnaces to behave in an undesired manner and the carbon black produced will be of a variable characteristic and structure other than that which is desired. Since the manifold 108 and air intake lines 104 must be maintained at a design pressure, a problem is created due to variable volume demand. As an example, if only furnace 101 is operating, only $x$ volumes of air must be supplied at the design pressure; but, however, if furnace 102 is operating also, $2x$ volumes of air must be supplied; and, of course, if furnace 103 is operating also, $3x$ volumes of air must be supplied. The problem referred to above is then to produce either $x$, $2x$, or $3x$ volumes of air *at the design pressure.* There are also situations in process operation where intermediate values of air supply are required.

Turning now to FIGURE 3, the above-mentioned problem will be graphically illustrated in the particular embodiment being described. The lower portion of FIGURE 3 is a pressure vs. volume plot, while the upper portion is a horsepower vs. volume plot. Referring to the lower plot, the curve APBCD is a typical curve indicating the relationship between compressor discharge volume and compressor discharge pressure for a particular compressor with nonvariable intake and discharge conduit sizes. Stated another way, for a particular compressor with a particular intake and discharge conduit size, the operation must move along the curve typified by APBCD. If the intake conduit, discharge conduit, or compressor characteristics are changed, another curve will be characteristic of the operation. For example, if a smaller intake conduit were used, the compressor operation might be represented by the curve ERFGH or some other similar curve, such as the one between APBCD and ERFGH. Then, in summary, a family of curves known generically as PV (pressure vs. volume) are representative of compressor operation.

As will be readily seen from the PV curves in FIGURE 3, there is a maximum point and a downward slope on each side of the maximum. Thus, as the volume output increases, the pressure first goes up, then reaches a maximum, and then goes down. Furthermore, since the particular centrifugal compressor (being operated at its constant rotational speed) and its conduits are capable of operating only along one curve, a particular pressure can be achieved only by adjusting the volume to a point where the pressure is that which is desired. With reference to the carbon black process, if, for example, it is desired to maintain the pressure in manifold 108 (and lines 104) at 4 p.s.i.g., then, assuming curve APBCD is reflective of the operation of compressor 10, we must move along curve APBCD until the desired pressure is achieved. Since the compressor will not function smoothly below the minimum horsepower or surge point, line BFI, the design pressure of 4 p.s.i.g. must be achieved on the right or high volume side of the maximum. The cooperating surge control will be subsequently explained in detail. Thus, to achieve a pressure of 4 p.s.i.g. at a gas volume above the surge point, we must move along the aforementioned curve from A to P to B to C and subsequently to D to achieve the design pressure necessary for proper process operation. It will be assumed, for purposes of illustration, that furnaces 101 and 102 are operating and that furnace 103 is not operating, and the volume demand is represented by line CGJ. Since we have moved along the curve to point D to achieve the design pressure and the volume demand is represented by line CGJ, the operating point in the manifold 108 must correspond to point G. Thus, we must achieve point G in the manifold 108 but we cannot move away from curve APBCD, due to the particular compressor used. This dilemma can be resolved by venting a portion of the compressed gas volume to the atmosphere through line 11. By venting this gas volume, we move on the line of constant (4 p.s.i.g.) pressure QGD from point D to point G. Thus, the vent has allowed us to move from the curve point for the particular compressor, D, to the process operating point G.

The area under a PV curve can be integrated against time and the integral is the rate of doing work, or power. If horsepower is plotted vs. volume, a curve, such as curve MKL in the upper portion of FIGURE 3, is produced. Referring again to the movement from the characteristic compressor curve D to the operating point G, a decrease in horsepower is indicated. When at point D the horsepower consumption is L to provide the full volume of air, while at point G it is K, the power required to provide the air actually used. Thus, the difference between K and L is representative of the horsepower lost in the volume vented to the atmosphere. Stated another way, due to the lack of an effective control system, the L minus K horsepower has been wasted in the volume vented to the atmosphere in the effort to move from D to G. When furnace 103 is operated with furnaces 101 and 102, the volume would be increased to a point between CGJ and DHN, but the principle of operation would be the same. If only one furnace were operated, a decrease in volume would be noted, but the principle again is similar.

In FIGURE 3 the line IFBM indicates the minimum volume or horsepower output that will allow the compressor to operate smoothly and respond to control, and is known as the surge point. Since the horsepower is plotted vs. volume, and bears a single-valued relationship thereto, it is possible to predicate a control system on sensing horsepower and controlling volume thus causing the compressor to always operate on, or to the right (increasing volume) of, line IFBM. Thus, such a system avoids surging and provides for orderly and controlled startup, shutdown, and other manipulations.

Referring now to FIGURE 2, the control system that solves the problems of surging and horsepower loss will be described in detail.

In FIGURE 2 there is indicated compressor 10. Also in FIGURE 2 discharge line 12 is divided into a vent discharge line 11 and a process discharge line 13. Additionally, there are indicated input or suction line 14, valve 15 therein, pressure controller 16, pressure sensor 17, valve 18, vent controller 19, and horsepower sensor 20.

As has been previously explained, a characteristic curve, say APBCD in FIGURE 3, is established. Other sizes of conduits will produce a family of characteristic curves as shown in the lower portion of FIGURE 3. Since the problem is to produce a compressor operation that is equivalent to the manifold operating point, the operating curve must cross the design pressure value at the particular, but variable, volume demand.

If valve 15 were manually controlled, a family of curves, such as shown in FIGURE 3 would result. If, by trial and error, a curve were found that crossed both the pressure and volume requirements, such as ERFGH, the process would continue to operate, due to the manual trial and error adjustment, with no loss of horsepower.

The impracticality of such a constant volume requirement has been fully explained. The volume requirement is, of course, different; depending on whether one, two, or all three carbon black furnaces are operating. Thus, each time a new volume is demanded, a new series of trial and error runs would have to be conducted in order to find a manual setting that would result in no horsepower loss due to venting. Of course, such trial and error runs would be grossly impractical and a manual control system is totally unsatisfactory.

According to this invention, the precise operating point is achieved automatically utilizing the principle of the family of curves reflecting different valve settings. Thus, accordingly, if the manifold pressure is demanded to be 4 p.s.i.g., pressure controller 16 is set at 4 p.s.i.g. Pressure sensing means 17 then senses the pressure in line 13, and this signal is communicated to pressure controller 16 which opens or closes valve 15 to restrict the intake into compressor 10 to the degree needed. The operation can be described by reference to FIGURE 3. When the compressor is started up, the volume will increase and, if no control system is used, the operation could be described by the line APBCD. The control system described will maintain the pressure by closing or opening valve 15 in response to the pressure sensed in line 13. Thus, the operating characteristics with the control system can be described by the line PRQGD, since the control system only functions to prevent pressure in excess of 4 p.s.i.g. in the discharge. Stated another way, the system will act as if there were no control system attached until point P is reached, at which time the control system will begin to function. Since valve 15 will be partially closed to maintain a constant pressure, the operating characteristics can be described as moving along the isobar PRQGD. Thus, the operation will move along the path APRQGD until the demanded volume is reached. If the volume demand changes, the control system will automatically move along the isobar PRQGD to select the volume actually being consumed in the process. In the embodiment being described, the point G will be reached, thus there is no horsepower loss as was associated with venting a given volume to move from D to G. Thus, the control system has actually selected curve ERFGH for operation to match the compressor output to the process demand. If the control system were detached and the valve left in the same position and the compressor shut down, the characteristics of shutdown could be described by the curve HGPRE instead of the curve HGQRPA if the control system were left on during shutdown. As a consequence of the above disclosure, it is readily seen the precise manner in which the control system changes the operating characteristics of the compressor by automatically opening and closing valve 15.

The surge point control will now be described with reference to FIGURE 3. According to the operation of the surge point control, horsepower sensor 20 senses a signal representative of the horsepower consumption and this signal is compared in vent controller 19 with the set point which is the minimum horsepower, M, for smooth operation. Specifically, when the volume (horsepower) level is below IFBM, controller 19 opens valve 18 to allow air to pass through the compressor so the operating point can be moved over the operating minimum. In many processes, the startup procedure demands that no mass be transferred through the process system initially, but the operating conditions of pressure and temperature be achieved in the various process units. Typically, carbon black furnaces such as 101, 102, and 103 are brought up to approximate operating conditions with no air flowing in line 104, and then the furnaces are put on stream and air volume begins to move through the compressor that has been running merely to maintain back pressure on the line. Since there is actually no air moving through the compressor before the furnaces are put on stream, the volume is essentially zero, thus the volume demand from a furnace going on stream will initially cause the compressor to operate in the surge or nonsteady state zone to the left (decreasing volume) of line IFBM. This results in a rough and uncontrollable startup.

This rough and uncontrolled startup (or shutdown) can be avoided through the operation of the above control system. Thus, when the compressor is running prior to a furnace being put on stream, horsepower sensor 20 senses a horsepower (volume) below the IFBM minimum and vent controller 19 opens valve 18. This allows volume to be conducted through compressor 10 and the operating point can then be moved from left to right. According to this invention, once the minimum level of volume (horsepower) is reached, valve 18 is partially closed by the action of controller 19 so as to maintain this minimum volume while the pressure control system throttles the compressor suction to maintain a 4 p.s.i.g. discharge pressure. Thus, the operating point is maintained at Q by venting and throttling until a furnace goes on stream. When a furnace is put on stream, increased air flow causes the operating point to move to the left of line IFBM along isobar QGD to provide only the air required at the pressure condition required, gradually closing valve 18 (reducing venting) as the volume demand increases until when the demand is equal or greater than the minimum power criterion (controller 19 set point value), valve 18 is fully closed. In cooperation with this volume control system, the pressure control system acts to limit the compressor suction pressure and thereby the compressor's volume-pressure relationship so as to hold the discharge pressure at 4 p.s.i.g. regardless of the air volume flowing. The described surge control system thus functions only during startup and shutdown and insures that both startup and shutdown are conducted in a controlled and orderly manner.

Thus, when the surge point control system and the horsepower-saving control system of this invention are used cooperatively, the compressor operating point moves along line APRQG to point P initially before the furnaces are put on stream. The combination of the surge point controller and the horsepower-saving controller subsequently moves the operation to from P to Q before the furnaces are put on stream. When the furnaces are put on stream, and the volume demand of the process is reflected by the pressure in line 13, valve 15 opens and valve 18 closes, and the operating point moves along line QGD to a point that corresponds to the particular volume demand, regardless of whether or not one, two, three or more furnaces are put on stream.

Various modifications of the described embodiment can be employed. As will be readily understood, any process in which gas compression control is needed can be used in place of the carbon black process. Additionally, the invention is equally applicable to any type of centrifugal type compressor that has a characteristic operating curve as shown in FIGURE 3.

Horsepower senser 20 can comprise any means for ascertaining motor horsepower and establishing a signal reflective thereof. Specifically, an electrical power measurement senser such as by a thermal converter or a current transformer as disclosed in Process Instruments and Controls Handbook, McGraw-Hill, 1957, chapter 8, can be used. Vent controller 19 can comprise any means that can compare the signal representative of the sensed power value with a set point signal representative of a desired compressor power consumption. If desired, other means to regulate the quantity of fluid flowing through conduit 11 can be used in place of valve 18. Valves 15 and 18, controllers 16 and 19 and measurement elements 17 are automatic process control components such as are available from numerous control equipment manufacturers such as The Foxboro Company, Foxboro, Mass., or Minneapolis-Honeywell Regulation Co., Minneapolis, Minn.

That which is claimed is:

1. A method of operating a motor-driven compressor whose discharge line is divided into a vent discharge line and a process discharge line comprising the steps of:
    (a) establishing a first signal reflective of the power of said motor;

(b) comparing said first signal with a value reflective of a predetermined minimum compressor horsepower below which compressor operation is unstable and therefore undesirable to generate a second signal;

(c) regulating the quantity of fluid flowing in said vent discharge line in accordance with said second signal to allow fluid to pass through said line only when said signal indicates compressor operation below said predetermined level;

(d) establishing a third signal reflective of pressure in said discharge line;

(e) comparing said third signal with a signal representative of a predetermined process discharge line pressure to establish a fourth signal; and (f) regulating the quantity of fluid flowing in the compressor input line in accordance with said fourth signal so as to allow a demanded volume to flow through said compressor while maintaining a predetermined process discharge line pressure.

References Cited

UNITED STATES PATENTS

| | | | |
|---|---|---|---|
| 1,216,119 | 2/1917 | Hinz | 230—115 |
| 1,280,811 | 10/1918 | Moss | 230—115 |
| 1,783,036 | 11/1930 | Crawford | 230—114 |
| 2,490,188 | 12/1949 | Ziepolz | 230—115 |
| 2,754,763 | 7/1956 | Hofer | 103—11 |
| 3,330,473 | 7/1967 | Lee | 230—115 |

LAURENCE V. EFNER, *Primary Examiner.*